United States Patent
Huang et al.

(10) Patent No.: US 8,583,416 B2
(45) Date of Patent: Nov. 12, 2013

(54) ROBUST INFORMATION EXTRACTION FROM UTTERANCES

(75) Inventors: Jun Huang, Fremont, CA (US);
Yookyung Kim, Los Altos, CA (US);
Youssef Billawala, Campbell, CA (US);
Farzad Ehsani, Sunnyvale, CA (US);
Demitrios Master, Cupertino, CA (US)

(73) Assignee: Fluential, LLC, Sunnyvale, CA (US)

( * ) Notice: Subject to any disclaimer, the term of this patent is extended or adjusted under 35 U.S.C. 154(b) by 1231 days.

(21) Appl. No.: 11/965,711

(22) Filed: Dec. 27, 2007

(65) Prior Publication Data

US 2009/0171662 A1    Jul. 2, 2009

(51) Int. Cl.
*G06F 17/28* (2006.01)
*G10L 15/00* (2013.01)
*G10L 21/00* (2013.01)

(52) U.S. Cl.
USPC ............... 704/3; 704/4; 704/251; 704/277

(58) Field of Classification Search
None
See application file for complete search history.

(56) References Cited

U.S. PATENT DOCUMENTS

| | | | | |
|---|---|---|---|---|
| 6,138,087 | A * | 10/2000 | Budzinski | 704/9 |
| 6,421,645 | B1 * | 7/2002 | Beigi et al. | 704/272 |
| 6,738,745 | B1 * | 5/2004 | Navratil et al. | 704/277 |
| 8,239,207 | B2 * | 8/2012 | Seligman et al. | 704/277 |
| 2003/0204492 | A1 * | 10/2003 | Wolf et al. | 707/3 |
| 2004/0148170 | A1 * | 7/2004 | Acero et al. | 704/257 |
| 2005/0131677 | A1 * | 6/2005 | Assadollahi | 704/201 |
| 2007/0016401 | A1 * | 1/2007 | Ehsani et al. | 704/9 |
| 2007/0100601 | A1 * | 5/2007 | Kimura | 704/4 |
| 2007/0185714 | A1 * | 8/2007 | Kim et al. | 704/254 |
| 2008/0133245 | A1 * | 6/2008 | Proulx et al. | 704/277 |

OTHER PUBLICATIONS

Langley et al., "Spoken language parsing using phrase-level grammars and trainable classifiers", S2S '02 Proceedings of the ACL-02 workshop on Speech-to-speech translation: algorithms and systems, vol. 7, pp. 15-22, 2002.*
Gu et al., "Concept-Based Speech-to-Speech Translation Using Maximum Entropy Models for Statistical Natural Concept Generation", IEEE Transactions on Audio, Speech, and Language Processing, vol. 14, No. 2, Mar. 2006.*
Levin et al., "The Janus-III Translation System: Speech-to-Speech Translation in Multiple Domains", Machine Translation, vol. 15, No. 1/2, Spoken Language Translation, pp. 3-25, 2000.*
Knight K., "A Statistical MT Tutorial Workbook", JHU Summer Workshop 1999.
SchOlze H., "Automatic Word Sense Discrimination," Computational Linguistics, vol. 24-1. pp. 97-124, 1998.
Brown P.F., Cocke J., Della Pietra S., Della Pietra V., Jelinek F., Mercer R., and Roossin P., "A Statistical Approach to Machine Translation," Computational Linguistics 16(2), 1990.

(Continued)

*Primary Examiner* — Brian Albertalli
(74) *Attorney, Agent, or Firm* — Fish & Associates, PC (57) ABSTRACT

The performance of traditional speech recognition systems (as applied to information extraction or translation) decreases significantly with, larger domain size, scarce training data as well as under noisy environmental conditions. This invention mitigates these problems through the introduction of a novel predictive feature extraction method which combines linguistic and statistical information for representation of information embedded in a noisy source language. The predictive features are combined with text classifiers to map the noisy text to one of the semantically or functionally similar groups. The features used by the classifier can be syntactic, semantic, and statistical.

19 Claims, 7 Drawing Sheets

(56) References Cited

OTHER PUBLICATIONS

Bikel D.M., Schwartz R., Weischedel R.M., "An Algorithm that Learns What's in a Name," Machine Learning, 34, pp. 211-231, 1999.

Och F.J., Tillmann C., and Ney H., . . . Improved Alignment Models for Statistical Machine Translation, in Proc. of the Joint SIGDAT Conf. On Empirical Methods in Natural Language Processing and Very Large Corpora, University of Maryland, College Park, MD, pp. 20-28, 1999.

Jelinek F., "Statistical Methods for Speech Recognition," The MIT Press, Cambridge Massachusetts, 1998.

Kirchhoff K., "Novel Speech Recognition Models for Arabic," Johns-Hopkins University Summer Research Workshop 2002.

Bellegarda J.B., "Exploiting latent semantic information in statistical language modeling," Proceedings of the IEEE, vol. 88, No. 8, pp. 1279-1296, Aug. 2000.

Michael B.W., Multiprocessor Sparse SVD Algorithms and Applications, PhD. Thesis, University of Illinois, Urbana-Champaign, 1991.

Christopher B., "A tutorial on support vector machines for pattern recognition," Data Mining and Knowledge Discovery, pp. 121-167, Kluwer Academic Publishers, Boston, 1998.

Callison-Burch C., Koehn P., and Osborne M., "Improved statistical machine translation using paraphrases," in Proceedings of NAACL-HLT 2006, pp. 17-24, New York, 2006.

Chen F .. Farahat A.. and Brants T .. Multiple similarity measures and source-pair information in story link detection: in Proceedings of NAACL-HLT 2004, pp. 313-320, Boston, MA, 2002.

Gildea D. and Jurafsky D., "Automatic labeling of semantic roles," Computational Linguistics, vol. 28, Issue 3, pp. 245-288, Sep. 2002.

Thorsten J., "Text categorization with support vector machines: learning with many relevant features," in Proceedings of the European Conference on Machine Learning, Springer, 1998.

Kishore P., "Why inverse document frequency?" in Proceedings of 2nd meeting of the North American Chapter of the Association for Computational Linguistics on Language technologies, pp. 1-8, Pittsburgh, PA, 2002.

Srihari R., Niu C., and Li W., "A hybrid approach for Named Entity and Sub-Type Tagging," in Proceedings of the sixth conference on Applied natural language processing, pp. 247-254, Seattle Washington, 2000.

\* cited by examiner

ROBUST INFORMATION EXTRACTION FROM UTTERANCES

FIELD OF THE INVENTION

The present invention relates to information extraction from speech-recognition systems.

BACKGROUND

For numerous speech interface applications, recognized speech needs to be mined for information relevant to the task to which it is applied. An example application is automated technical phone help, where a virtual operator directs the call based on the natural language utterance of a caller. The virtual operator, like existing IVR systems, might ask "Please state the nature of your problem" and the system must be capable of directing the caller to the appropriate resource. Another example is closed-domain canonical speech-to-text or speech-to-speech machine translation, where the various ways of expressing the same idea are grouped together, and either via a grammar or classifier, the utterance is mapped to the appropriate group and a canonical translation is the output. When no resource exists to handle the utterance, the system must be capable of correctly rejecting the utterance and in the example of the virtual operator, either ask further questions or redirect the caller to a human operator.

The task of classifying an utterance properly is complicated by the introduction of recognition error, which is inherent to any recognition system. It is the challenge of information extraction of recognized speech to be robust to that error.

A recognizer converts an input speech signal into a text stream. The output text may be an "one-best" recognition, an "N-best" recognition, or a word-recognition lattice, with associated recognition confidence scores. Recognitions are based upon both an acoustic model, which models the conversion of an acoustic signal into phonemes, and a language model, which models the probabilistic distribution of word sequences in a language. The broader the domain an ASR engine is trained to recognize, the worse the recognizer performs. Determining the balance between recognition coverage and recognition accuracy must be addressed in the creation of an ASR system.

The text of an utterance, which may be processed linguistically to aid in the labeling of semantic information, is then mined for the information relevant to the task for which the system is designed.

The text of the utterance can be mined via a rule-based approach, wherein "grammars" are applied to an input text stream. Grammars in this context refer to manually or (semi) automatically generated rules, which attempt to predict structural patterns of an input text stream.

The advantage of the manually created extraction grammars is that there is no requirement for large amounts of training data. The method, however, does require human expertise to create these grammars and is therefore labor intensive and susceptible to low recall or conversely low precision. On the other hand, the more automatically (or less dependent upon human expertise) the grammar is created, however, the more training data is necessary. Training data, depending on the task, may not be readily available.

In addition to insufficient rules, rule ambiguity and recognition error reduce the accuracy and coverage. Rule ambiguity occurs when multiple rules apply to an input text stream, and there is no reason (statistical or otherwise) to choose one over the other. Recognition error makes the extraction of the information less accurate. Though rule-based approaches tend to be robust to recognition error, their coverage and accuracy are still diminished.

SUMMARY OF INVENTION

The performance of traditional speech recognition systems (as applied to information extraction or translation) decreases significantly with scarce training data and under noisy environmental conditions. This invention mitigates these problems through the introduction of a novel predictive feature extraction method which combines linguistic and statistical information for representation of information embedded in a noisy source language. The predictive features are combined with text classifiers to map the noisy text to one of the semantically or functionally similar groups. The features used by the classifier can be syntactic (such as word parts-of-speech), semantic (such as labeled concepts), and statistical (such as n-gram word sequences).

In many mined utterances, contribution from each individual word to meaning representation and categorization varies significantly. To overcome this problem, we introduce a singular value decomposition algorithm based on the vocabulary in our domain being weighted by the information gain in each word. We refer to this algorithm as Information Weighted Singular Value Decomposition (IWSVD). In this way, we can incorporate measurement of word's importance into statistical feature extraction, in order to make the extracted features more separable for utterance classification.

To overcome the problem of over-fitting in text classification, we introduce a technique to increase the cross-entropy of the distribution among different training classes and to use unlabelled training data to adapt the classification models learned from labeled training data. Additionally the system is also capable of leveraging pre-existing rule-based classifiers to improve precision and recall.

The classification task can be implemented as a classification into a flat structure or a multi-level hierarchy of classes. A hierarchy allows the classifier to break up the problem of classification into stages. A hierarchical classification approach minimizes the degradation of classification accuracy with an increasing number of classes. The hierarchy (or clustering) of classes can be achieved through manual or automatic clustering. This classifier is trained at all levels within this hierarchy.

DESCRIPTION OF THE DRAWINGS

The foregoing and other objects, aspects and advantages of the invention will be better understood from the following detailed description of the preferred embodiments of this invention when taken in conjunction with the accompanying drawings in which.

DETAILED DESCRIPTION OF THE PREFERRED EMBODIMENTS

We will describe our specific effort using support vector machines (SVMs), but any classification algorithm can be used in their place. SVMs are based on the structural risk minimization principle from machine learning theory. The underlining principle of SVM is to map the training vectors into a higher dimension using kernel method, and then try to find the separating hyper-planes with maximal margin in the higher dimension space. The SVM system contains three major components, namely feature extractor, training system, and the classifier.

The classification is independent of language. However, any non-statistical features, such as word part-of-speech or concept labeling, needs to be provided for that language.

The invention is applied to situations where a spoken utterance needs to be mapped to a class. A class in the set of classes can refer to any group of one or more sentences upon which a learning algorithm may be trained. The more training examples for any given class, the better the precision and recall of that class.

The purpose of the text classifier is to automatically map an input text into predefined groups. The invention combines a machine learning approach with a rule-based approach. The machine learning algorithm may be a neural net, a decision tree, a naïve Bayesian, support vector machine (SVM), a K-Nearest Neighbor classifier, or any other similar algorithm trained on the predefined classes. The rule-based approach uses regular expression rules to map text into "templates." The classification system presented here is the combination of two classifiers which improves the precision and coverage in the presence of ASR error.

Classifier Approach

The first component extracts hierarchical features using both linguistic and statistical features. The feature extraction algorithm combines the advantages from both linguistic analysis and statistical modeling to transform the term space into a more separable feature space, which in turn significantly improves the precision and recall of the classifier. The extracted linguistic features include, but are not limited to:

Part-of-Speech (POS) tags
Semantic features
Stemmed words
Syntactic information
Named-Entities or other lexical classes The extracted statistical features include:

Bag-of-words
N-grams
Statistical language model
SVD vectors
IWSVD vectors

Figure 6:
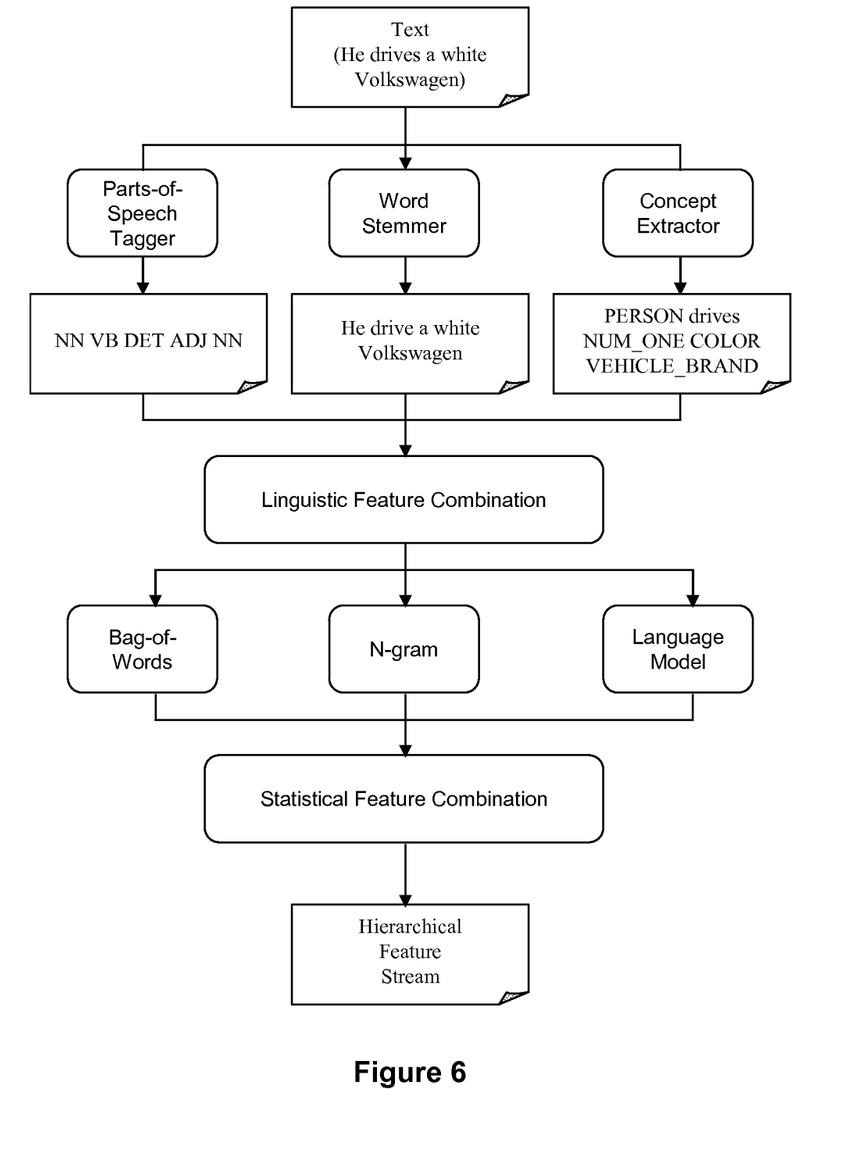
FIG. 6 is an example of predictive features extracted from input English text.

FIG. 6 is an example of predictive features extracted from input English text. Linguistic features such as part-of-speech (POS) tags, word stems, and lexical classes are first extracted from the input texts. The extracted information is combined and passed through a module to capture the statistical information between the surface-form words and linguistic structures. Some examples of statistical features include n-grams, bag-of-words, statistical language models, and IWSVD vectors.

Figure 1:
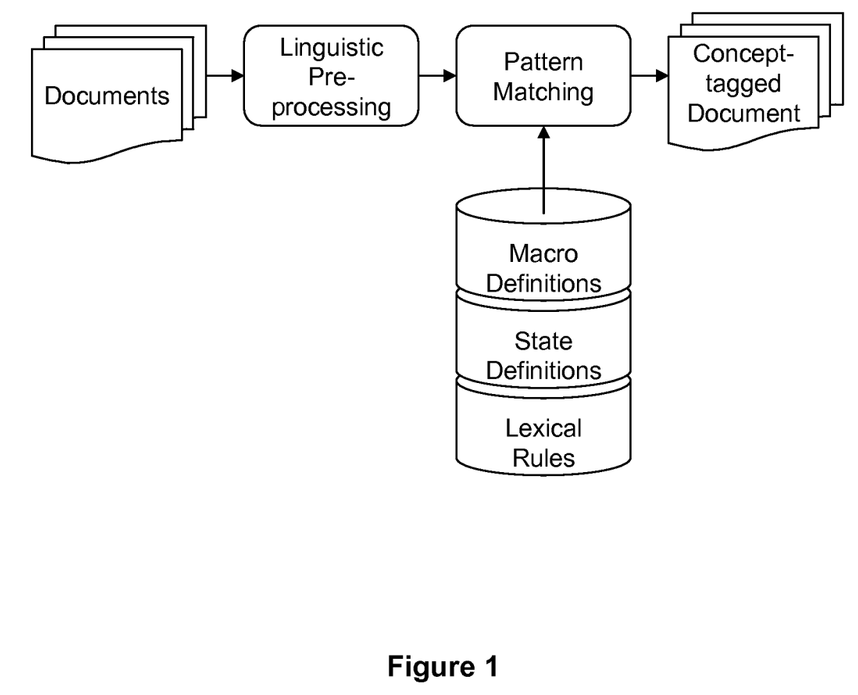
FIG. 1 illustrates a system diagram of lexical class tagger for concept extraction.

This invention uses tagging rule based pattern matching method to extract semantic information, which is embodied in noisy input text. FIG. 1 illustrates a system diagram of lexical class tagger for concept extraction. First, an input document undergoes linguistic pre-processing, such as text normalization and word stemming. Then tagging rules are applied to the document to extract and label semantic information from input document. The output is concept-tagged document. The tagging rules consist of three components, namely macro definitions, state definitions, and action definitions. Macros are abbreviations for regular expressions. A macro can also be embedded into another for more efficient and modularized representation of regular expressions. The macros can be automatically extracted from manually annotated lexical classes. A state acts as a constraint for the search scope of pattern matching. If the tagger is in state <S>, only expressions that are preceded by the starting condition <S> can be matched. The action defines the system's response when certain parts of the text are matched given the macro expression in the current state. For example, the action tag will assign a specified concept tag for matched regular expression. The action state will perform the state transition for the matched text. We can use different algorithms, such as greedy search, to perform pattern matching between the input texts and defined lexical rules. The output of this system is tagged documents with extracted concepts.

This invention introduces a way to extract discriminative features for text classification. In this invention, each class (such as Question type) is modeled by a document. A word co-occurrence matrix is derived from training data across all documents information metric models, such as TF-IDF, IDF, and information gain (IG), are derived from a word-document matrix of the training corpus, to create discriminative weights. The final statistical model (as an SVD vector or a word or phrase value) is the linear combination of information metric weighted word vectors or phrase values.

Figure 4:
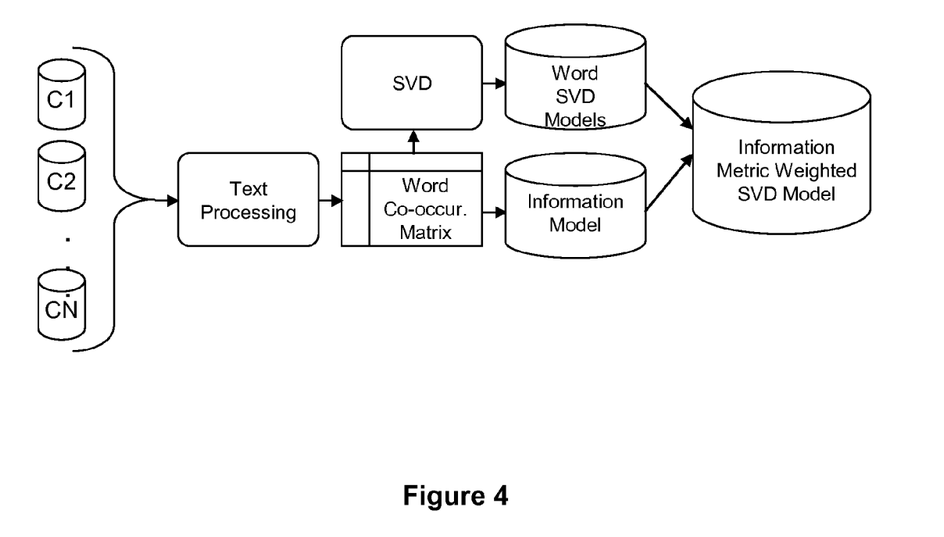
FIG. 4 is an illustration of procedures to create an information metric weighted singular value decomposition (IWSVD) model.

FIG. 4 is an illustration of procedures to create an information metric weighted singular value decomposition (IWSVD) model. The input texts are first processed using techniques such as text normalization. Next, the word co-occurrence matrix is computed, which is used as input of singular value decomposition (SVD) model training. Information metric models, such as inverse document frequency (IDF), term frequency—inverse document frequency (TF-IDF), and information gain (IG), are computed from the text and their corresponding document vectors. The sentence level feature vector is a linear combination of word level SVD vectors, weighted by information metric which measures the importance of each word inside the document.

Classifier Training

Figure 2:
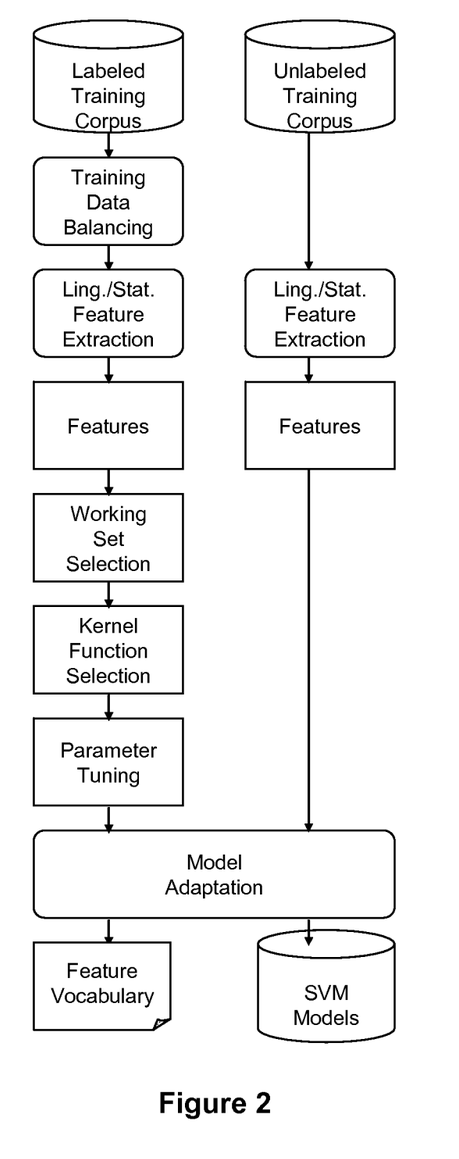
FIG. 2 illustrates procedures to train models of a specific text classifier, namely SVM, with both labeled and unlabeled training data.

FIG. 2 illustrates procedures to train models of a specific text classifier, namely SVM, with both labeled and unlabeled training data. First, the labeled training data is pre-processed to make the distribution between the training classes more consistent. Both linguistic and statistical features are extracted and combined from balanced training data. Next, the labeled training examples are decomposed into active and inactive parts for iterative working set selection. The active part of the model denotes the set of parameters which will be optimized during current step of model training, and the parameters of the inactive part will keep unchanged during the current iteration. Various kernel functions are applied to map the feature space into a higher dimensional space which maximizes the separation between the training classes. Further parameter tuning is necessary to achieve optimal model parameters of the labeled training data. A certain amount of unlabeled training data is also used to adapt the "labeled" trained classification models. The unlabeled training data is constrained to have uniform distribution among classes, which improves the generative power of learned classification models for unobserved testing data. The output of SVM training component consists of feature vocabulary and SVM models.

During the training stage, the extracted feature vectors are mapped into a higher dimensional space using kernel functions. Some examples of the kernel functions include linear kernel, polynomial kernel, radial basis kernel (RBF), and sigmoid kernel. Then a quadratic optimization algorithm is used to estimate the support vectors which maximize the separation margins between the training classes.

The next step in model training called working-set selection decomposes the learning task into a series of smaller tasks. We split the training samples into an "inactive" and an "active" part. During recursive estimation, model parameters in the active part are estimated and updated, while parameters in the inactive part are fixed at the current iteration. The decomposition assures that this will lead to progress towards global minima in the objective function, if the selected working set fulfills certain constraints. The working set selection significantly reduces the memory requirement of the learning algorithm, especially in the case of large number of training samples, or high dimensionality of feature space. At the same time, it guarantees the convergence of the learning algorithm with sufficient number of iterations.

In this invention, we also use two approaches to overcome the over-fitting problem of SVM learning, which means the model trained with existing labeled data might achieve high classification precision, although it will lose generalization power when the test data is unseen from the training corpus, or the testing condition is significantly different from the training condition. In the first approach, we reduce the cross-entropy between training classes, so that the distributions of training data across different classes become more similar. Second, we use a transductive training approach to compensate for unmatched testing conditions. We first train the SVM with labeled training data. Then we use a small amount of unlabeled data to adapt the learned models, with the constraint that the unlabelled adaptation data should have uniform distribution after classification.

Classifier Testing

Figure 3:
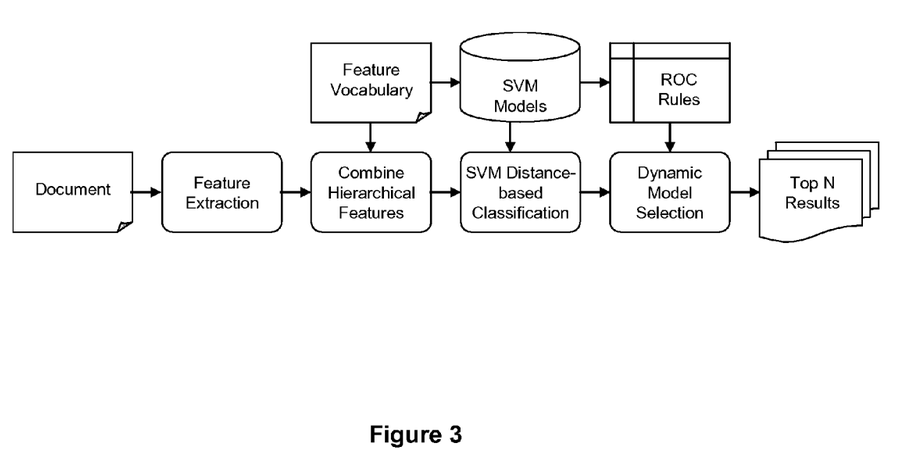
FIG. 3 illustrates a procedure to classify an input document into paraphrased representation of the source language text.

FIG. 3 illustrates a procedure to classify an input document into paraphrased representation of the source language text. First, the input text is transformed into predictive features suitable for the classification task. Linguistic features such as lexical classes and parts-of-speech (POS) tags are extracted from the input document. These linguistic features are combined with statistical features, such as n-grams, bag-of-n-grams, and statistical language model, to form attribute-value representation of the source language text. Next, kernel functions are utilized to find the projection of input feature vector onto support vectors from learned SVM models. A maximum projection criterion combined with dynamic thresholds learned from the training data, are used to select the final top-N classification results of the input document.

The classification result is determined by maximum likelihood criterion using projection scores from feature vectors of testing sentences to each SVM models. We also introduced a dynamic decision method, which tries to improve the precision of classifier in presence of noisy data. The basic idea is to collect first and second order statistics of the projection scores of test vectors into SVM models, and use this information to determine optimal criterion for each test sentence, instead of fixed parameter across different testing sentences.

Next, we convert the SVM projection score into confidence score, which gives a reliable measurement of the certainty of classification result, especially under noisy condition. The confidence score also helps the system to determine optimal back-off strategy, and rejection decision.

Figure 5:
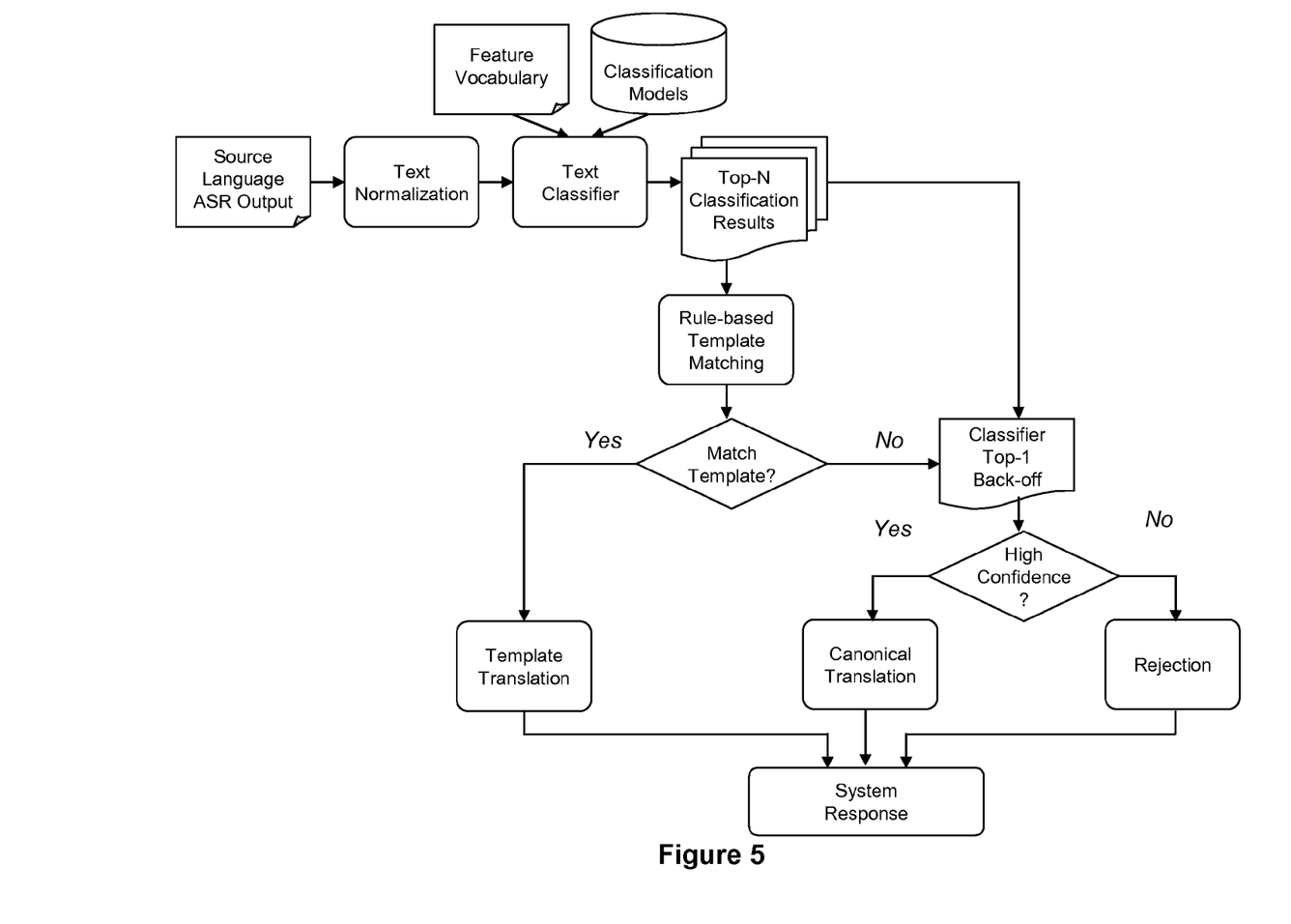
FIG. 5 illustrates a system diagram of classification-based paraphrase translation under ASR condition.

FIG. 5 is a system diagram of classification-based paraphrase translation under ASR condition. First, the automatic speech recognizer (ASR) output of the source language is transformed into attribute-value representation with both linguistic and statistical features. The transformed feature vector is passed through a text classifier to predict top-N paraphrase representation of the source language. Next, a rule-based matching is conducted to search for matched templates between input text and linguistic formalization of the source-to-target translation. If we find perfect matching between processed source language text and predefined template, the template translation is output as target language translation. Otherwise, we back off to top-1 candidate of classification result, and evaluate the confidence score of such hypothesis. If the confidence score is above predefined threshold, we use the canonical translation of top-1 hypothesis as our paraphrased translation. Otherwise, the system will either prompt the user to rephrase his/her utterance, or reject the user query.

Creating Hierarchies

The classification task can be implemented as a classification into a flat structure or a multi-level hierarchy of classes. A hierarchy allows the classifier to break up the problem of classification into stages. A hierarchical classification approach minimizes the degradation of classification accuracy with an increasing number of classes. The hierarchy (or clustering) of classes can be achieved through manual or automatic clustering. This classifier is trained at all levels within this hierarchy.

Figure 7:
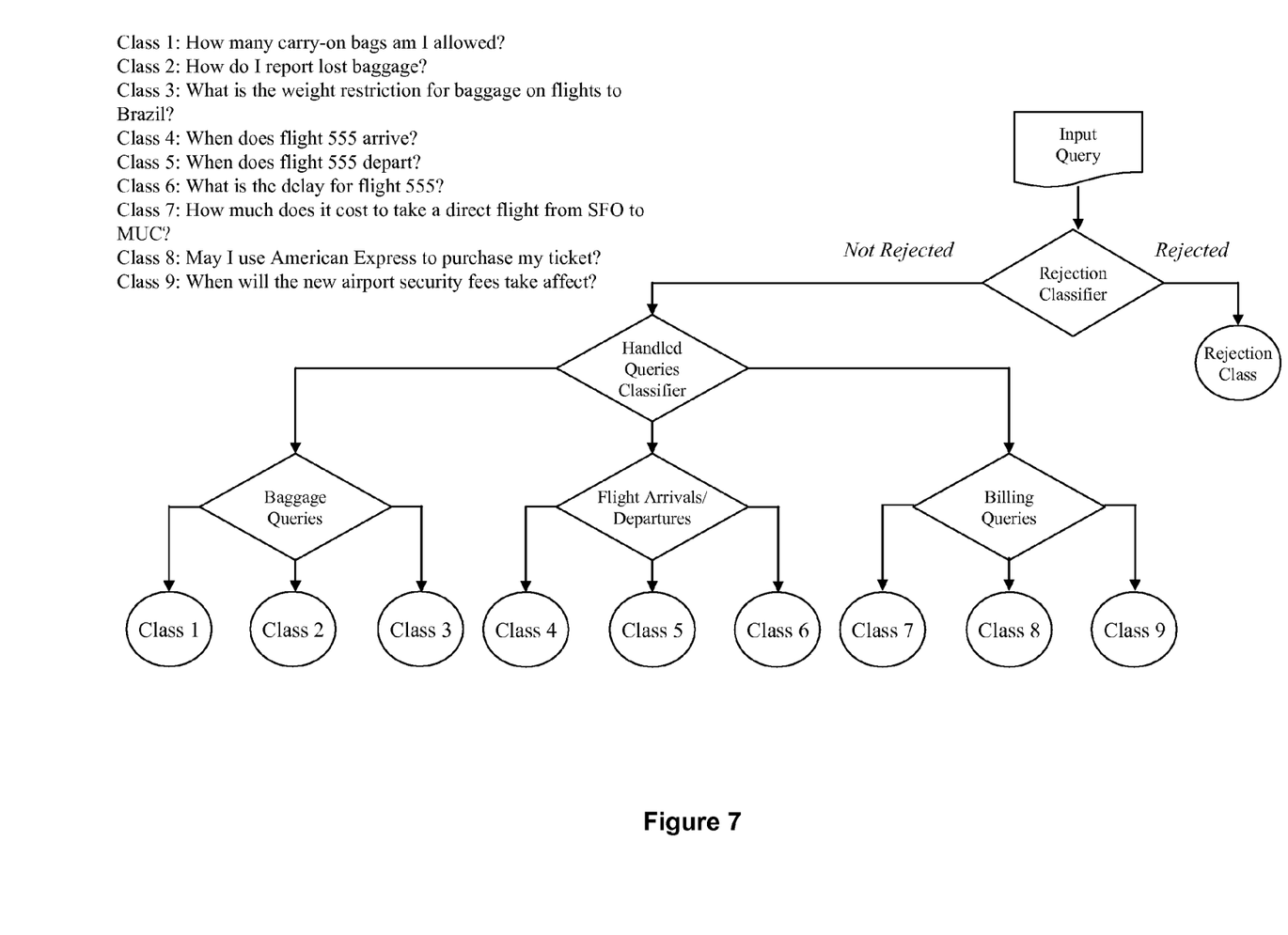
FIG. 7 is an example of hierarchical classification of an input query.

A hierarchy groups a set of classes (or documents) together based upon some measure of similarity, such as semantic similarity (see FIG. 7 for an example). Each level within the hierarchy presents a classification task for the classifier. The combined clustering and classification technique provides an effective solution for mapping recognized speech to a group by capturing the most distinguishing features in the utterance be it for paraphrase-based MT or information extraction.

FIG. 7 is an example of hierarchical classification of an input query. The hierarchical classifier is created as virtual category tree, where each category can belong to at most one parent category, and documents can be assigned to one or multiple leaf classes. During the classification, information extracted from the input query are classified from coarse to fine granularity.

There are two general approaches to creating the hierarchy: manual and automatic.

A hierarchy can be manually created, wherein documents that someone determines belong in the same sub-domain may be grouped together. There is no requirement that the classes or group of classes (at higher levels in the hierarchy) be equally balanced.

A hierarchy can also be created automatically. One approach is to perform confusion clustering. Confusion clustering takes an approach which optimizes clustering based upon the task at hand. Documents which the classifier has difficulty distinguishing between are clustered together to create each level in the hierarchy. The level of "difficulty" must be determined empirically to maximize the precision/recall of a development test-set of ASR recognized sentences. Although confusion clustering works, there is no reason that other clustering techniques, such as partitional (such as k-means or fuzzy c-means) hierarchical (such as agglomerative) or probabilistic clustering (such as Gaussian).

The method might proceed as follows. First a classifier is trained on clean (no recognition error) classes. Second, a development set of test sentences, where each class has a statistically significant representation, is recognized using a speech recognition engine. Third, the "dirty" sentences are classified. Those that are mis-classified are considered confusable. Such a confusion matrix is created, and clustering proceeds thereupon. Note that the cutoffs for cluster membership must be determined empirically.

Classifying into a Hierarchy

There are numerous strategies of classifying into a hierarchy.

In the top-down approach, a test sentence is first classified at the top level and then classified based on the child nodes of the lower level classifiers, and so forth.

In the bottom plus top-down approach, the sentence is classified at the baseline, and, if the score is above a certain threshold, it is tagged with that class. If however, it is below that threshold, it is put into the top-down approach. This has the advantage of just using the hierarchy for those sentences which seem to have confusability.

A modification of the bottom plus top-down approach would be to again first classify at the base level. If the sentence is below the threshold, however, reclassify it against the other members of the baseline winner's cluster.

Further one could make use of the N-best classifications of the classifier. In the top-down approach one might take the top N classifications at the $1^{st}$ level and then consider the cumulative score of the top level and the lower level to achieve the winning class.

Rejection Model

A rejection model is necessary to capture inputs which are not handled by the classifier whether in a hierarchy or not. The result of a rejection classification depends on the task to which the classifier is applied, but in the case of an automated operator it could be to direct the caller to a human operator. A rejection model is trained on a group of sentences which are in the domain but not handled by the system. This can be created semi-automatically, by seeding the class with utterances which have very low classification scores, and then having them filtered by a human judge. Subsequent iterations of the system should perform a classification between handled and not handled on the top level (see FIG. 7) as the first step in the system. This can also be simply created just from a list of utterances that we have in our system that are not being handled by the classification system.

At any level utterances which have very low classification confidence scores can either be rejected or the system can back off to the previous classification step and the system, for example, can interact with the user and verify the specific class for example with a statement like: "I think you asked about baggage. Is that correct?" and proceed to ask questions specific to this part of the hierarchy.

A novel predictive feature extraction method which combines linguistic and statistical information for representation of information embedded in a noisy source language can be employed.

An information metric weighted singular value decomposition (IWSVD) model, which incorporates measure of word's importance (with regard to classification task) into SVD vectors for discriminative statistical feature extraction can be utilized.

A dynamic decision method, combined with confidence measurement, to provide a flexible solution to text classification with different accuracy and coverage requirements, can be employed as well.

A mixed approach to refine the classification further by harnessing rule-based template matching, to perform robust interpretation and meaning extraction for ASR recognized text can be utilized. We first use both rule-based system and automatic classifier to reinforce interpretation results with high confidence score for highly accurate meaning extraction. Then we use the back-off strategy to further improve the coverage of interpretation engine.

A training procedure can be used to alleviate the overfitting problem in machine learning, through the reduction of cross-entropy between different training classes.

A hierarchical classification method can be used, which combines clustering, automatic classification, and fuzzy matching methods, to perform information extraction and classification at different levels of granularities.

A semi-supervised approach can be used to cluster and classify confusable documents with overlapping features. We first use small number of labeled training data to estimate statistical models of automatic classifier. Then we group mis-classified documents with relatively low confidence score, and high off-diagonal values in confusion matrix to adapt the decision boundaries of classifiers. We perform the above procedures recursively to discover optimal classifiers from large number of automatically generated auxiliary classification problems on unlabeled data.

Note all of this methodology assumes that our input is from a speech recognizer, however there is nothing preventing us from using the same system for classifying text data for such application as automatic question-answering.

While the present invention has been described with reference to certain preferred embodiments, it is to be understood that the present invention is not limited to such specific embodiments. Rather, it is the inventor's contention that the invention be understood and construed in its broadest meaning as reflected by the following claims. Thus, these claims are to be understood as incorporating not only the preferred embodiments described herein but also all those other and further alterations and modifications as would be apparent to those of ordinary skilled in the art.

We claim:

1. A method for classifying utterances, comprising the steps of:
   providing access to a speech recognition engine;
   receiving, by the speech recognition engine, an utterance as input;
   using an automatic speech recognizer to covert the utterance into a text string;
   generating an action-based concept tagged document of the text string;
   classifying the text string into one or more semantic classes based at least in part on the action-based concept tagged document;
   predicting paraphrased representations of the input with respect to a source language based on the one or more semantic classes; and
   outputting a top candidate of the paraphrased representations in a target language.

2. The method of claim 1, wherein the classifying step includes using features sets and classification models to classify the text string into the classes.

3. The method of claim 2, further comprising extracting and combining statistical features, syntactic features, and semantic features from a training corpus to generate the feature sets.

4. The method of claim 1, wherein the classifying step further comprises extracting feature sets from the text string.

5. The method of claim 2, further comprising generating the classification models as a function of extracted features of a training corpus.

6. The method of claim 2, further comprising weighting features in the feature sets according to an information metric model from a training corpus.

7. The method of claim 1, wherein the classifying step further comprises classifying the text stings into one or semantic classes according to a hierarchy.

8. The method of claim 7, further comprising generating the hierarchy based on clustering of the semantic classes.

9. The method of claim 8 further comprising creating the clustering of the semantic classes based on misclassified data.

10. The method of claim 1, wherein the classifying step further comprising refining classification of the one or more semantic classes via rule-base template matching.

11. The method of claim 3, further comprising balancing the training corpus before generating the feature sets.

12. The method of claim 7, wherein the classifying step comprises performing a top-down classification of the one or more sematic classes according to the hierarchy.

13. The method of claim 7, wherein the classifying step comprises performing a bottom plus top-down classification of the one or more semantic classes according to the hierarchy.

14. The method of claim 1, wherein the classifying step comprises rejecting out-of-domain utterances based on a rejection model.

15. The method of claim 1, further comprising translating the classified text string based on the one or more semantic classes.

16. The method of claim 1, further comprising providing more than one n-best results from the speech recognition engine that are used as input text strings to the classifying step.

17. The method of claim 1, further comprising using a word recognition lattice from the speech recognition engine as input text strings to the classifying step.

18. The method of claim 1, further comprising using the semantic classes to control behavior of an IVR system.

19. The method of claim 1, wherein the receiving the utterance step includes detecting the utterance as noisy input and wherein the text string comprises noisy text input.

* * * * *